United States Patent [19]

Seiy

[11] 4,411,727

[45] Oct. 25, 1983

[54] HANGER ROD TRANSFER ASSEMBLY FOR HANGING-TYPEFILE FOLDERS

[75] Inventor: Robert Seiy, Milwaukee, Wis.

[73] Assignee: The Kempsmith Machine Company, Milwaukee, Wis.

[21] Appl. No.: 275,840

[22] Filed: Jun. 22, 1981

[51] Int. Cl.[3] .......................... B32B 31/12; B23Q 7/02

[52] U.S. Cl. .................................... 156/562; 156/552; 156/566; 156/567; 156/569

[58] Field of Search ............... 156/560, 562, 567, 569, 156/566, 568, 363, 552, 475; 221/217, 277

[56] References Cited

U.S. PATENT DOCUMENTS

| | | | |
|---|---|---|---|
| 2,107,311 | 2/1938 | Strickler | 156/566 |
| 2,471,288 | 5/1949 | Schulz | 156/569 |
| 2,980,565 | 4/1961 | Bardach et al. | 156/567 |
| 3,576,695 | 4/1971 | Stine | 156/567 |
| 3,700,528 | 10/1972 | Kidd | 156/552 |
| 3,707,425 | 12/1972 | Jamal | 156/566 |
| 4,238,273 | 12/1980 | Memmel, Jr. | 156/552 |
| 4,293,369 | 10/1981 | Dilot et al. | 156/566 |

*Primary Examiner*—Michael G. Wityshyn
*Attorney, Agent, or Firm*—Ronald E. Barry

[57] ABSTRACT

A hanger rod transfer assembly for transferring hanger rods from a magazine to the edge of a file folder blank, the transfer assembly including a pair of transfer wheels for each edge of the blank, each transfer wheel having a plurality of corresponding grooves for supporting hanger rods, and guide plates covering a portion of the peripheral surface of each of said transfer wheels to retain the hanger rods in the grooves in the transfer wheels and a pad positioned below each edge of the blank to move the edge of the blank into a position to receive a hanger rod as the hanger rod is released from the guide plates.

12 Claims, 7 Drawing Figures

HANGER ROD TRANSFER ASSEMBLY FOR HANGING-TYPEFILE FOLDERS

BACKGROUND OF INVENTION

Hanging file folders require the positioning of hanger rods on the edges of the file folder blanks. In order to provide support for the file folder, these rods were originally placed on the blanks by hand and the edges folded over to glue the rods in position. More recently the file folder blanks have been manufactured in automatic conveyor systems in a stepped sequence and various types of machines have been used to place the rods on the glue strip provided at a spaced interval inwardly from the edge of the blank. A number of machines have been designed to accomplish this function, however, for various reasons difficulties have been encountered in precisely locating the hanger rods on the blanks.

SUMMARY OF INVENTION

The hanger rod assembly according to the present invention provides for the accurate transfer of a hanger rod from a magazine to a position immediately adjacent to the glue strip provided along the edge of the rod. The file folder blank is moved upward to push the glue strip on the blank against the hanger rod so that the hanger rod is firmly pressed against the file folder blank. The hanger rod is simultaneously released from the transfer mechanism so that it will move with the file folder blank when the blank is returned to the path of travel. Accuracy of alignment of the blank has been achieved by providing a momentary stop in the longitudinal movement of the blank so that the blank is positively located below the transfer wheels when the hanger rod is released.

IN THE DRAWINGS

DESCRIPTION OF THE INVENTION

Figure 1:
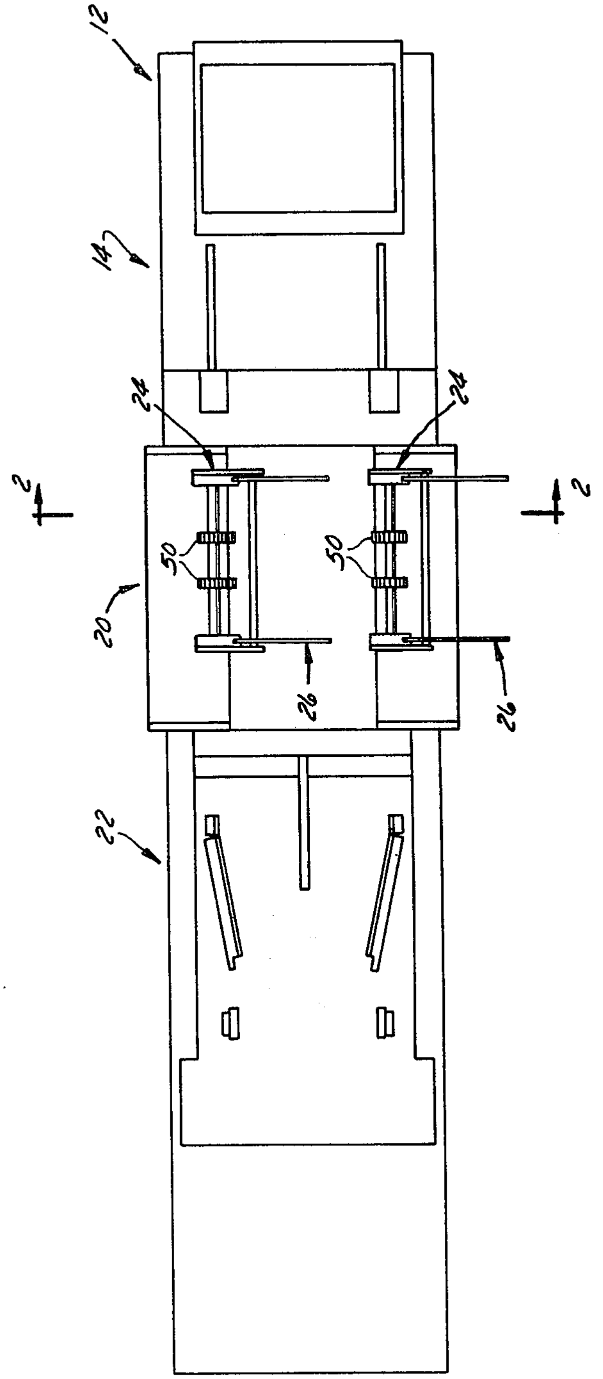
FIG. 1 is a schematic view of a file folder assembly machine.

The automatic manufacture of hanging file folders having hanger rods of a type contemplated herein mounted on the end of the folders is well known. These systems as seen in FIG. 1 generally move a file folder blank 10 along a path of travel which initially includes a feed station 12. File folder blanks 10 which have been previously cut and scored are then fed to a glue station 14. Means are provided at the glue station for applying a strip or bead 16 of glue to each end of the blanks at spaced intervals from the edge. The file folder is then moved to the hanger rod pickup and transfer station 20 where hanger rods 18 are deposited on the glue strip 16 on the blanks. The blanks are then moved to the fold and glue station 22 where a strip or bead of glue is applied to the ends of the blanks inside the hanger rods and the edge of the blank then folded over the hanger rods to hold the hanger rods in place on the blank.

In accordance with the present invention a unique and novel hanging rod pickup and transfer assembly 24 is provided at the pickup and transfer station 20 for accurately locating the hanger rods directly onto the glue strip 16 on the file folder blanks 10. The hanger rod transfer assembly is used to transfer the hanger rods 18 from a hanger rod magazine 26 to a position directly over the glue strip 16 on the file folder blank. Means are provided for lifting the (glue strip) portion of the file blank having the glue strip 16 to a position to engage the hanger rod 18 as it is released from the hanger rod transfer assembly 24.

Figures 2, 7:
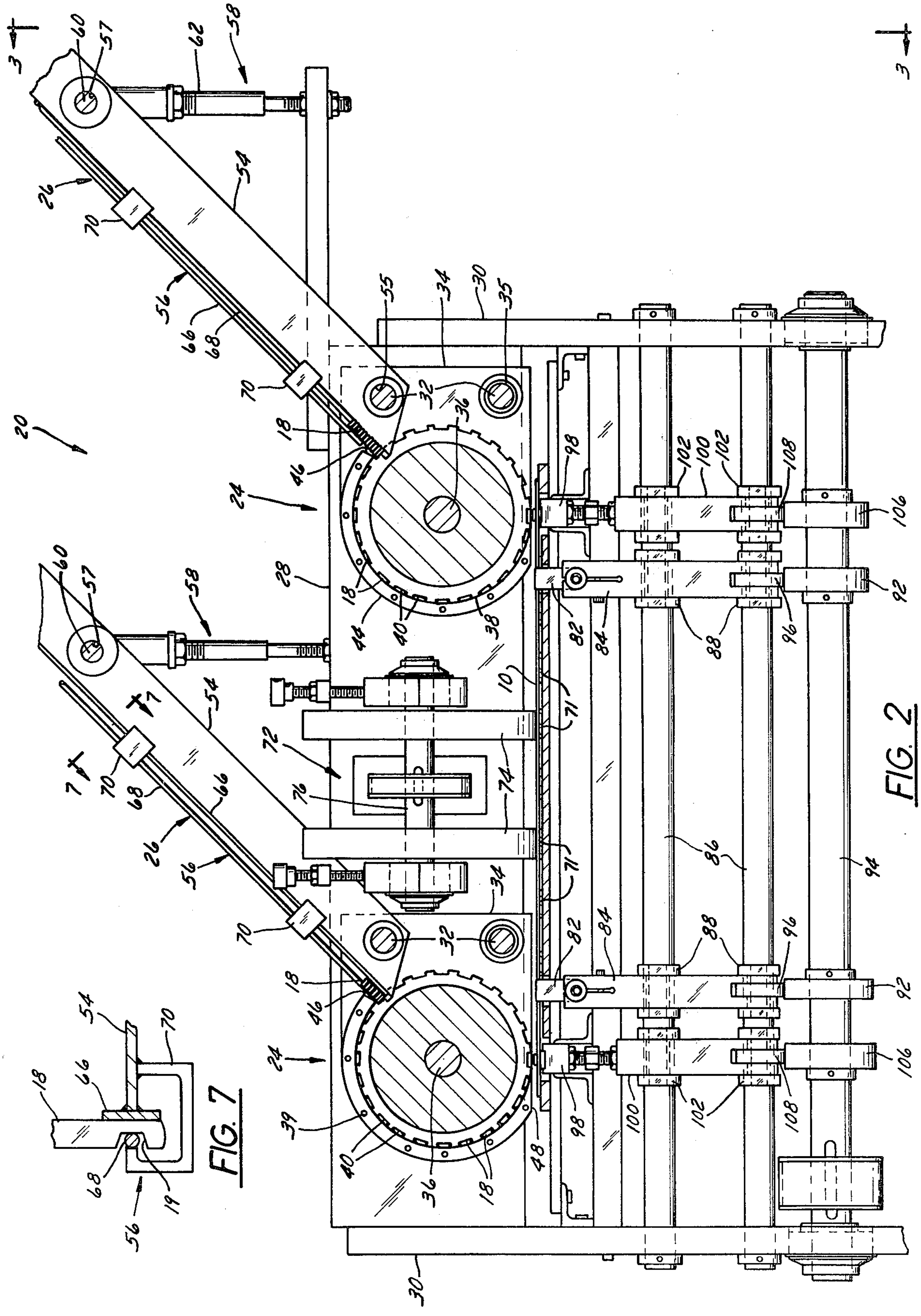
FIG. 2 is a view in section taken on line 2—2 of FIG. 1 showing the hanger rod transfer assembly according to the invention.
FIG. 7 is a view taken on line 7—7 of FIG. 2 showing the hanger rod guide assembly for the magazine.
Figure 3:
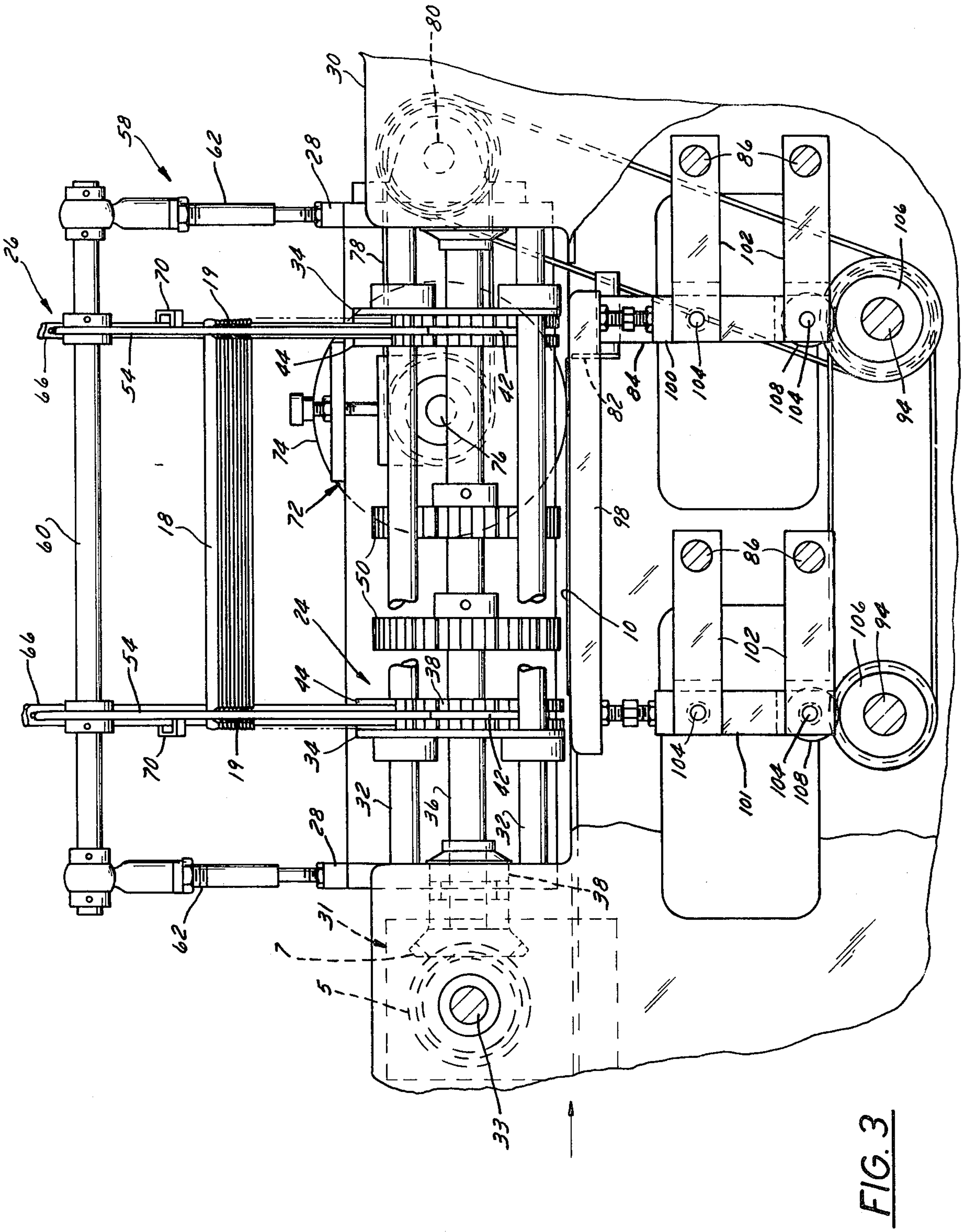
FIG. 3 is a view taken on line 3—3 of FIG. 2 showing the transfer assembly for one side of the file folder blank.
Figure 6:
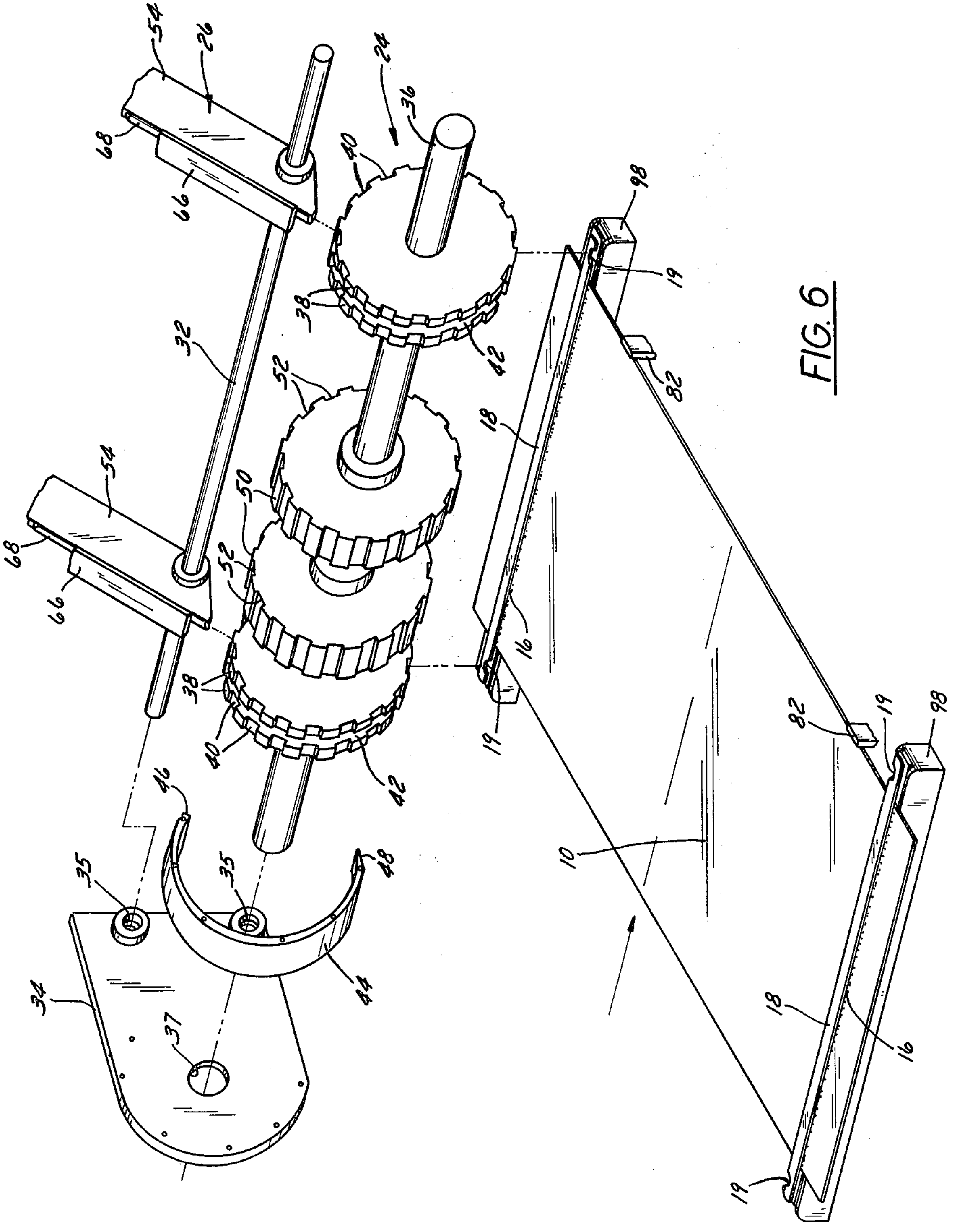
FIG. 6 is an exploded perspective view showing one of the hanger rod transfer assemblies.

In this regard and referring to FIGS. 2, 3, and 6, the hanger rod transfer assemblies 24 are shown supported on cross plates 28 provided on the conveyor frame 30 by means of support rods 32. Each assembly 24 includes a pair of side plates 34 each having a pair of support bushings 35 and an opening 37. The bars 32 extend through the bushings 35 and are seated in the cross plates 28. A drive shaft 36 is journaled in the side plates 34. Means in the form of cylindrical transfer wheels 38 having a plurality of grooves 40 are mounted on the shaft 36 to transfer the hanger rods 18 from the magazine 26 to a position above the file folder blanks 10. Each wheel includes an annular groove 42.

Means are provided on the side plates 34 for retaining the hanger rods 18 in the grooves 40 during the rotary motion of the wheel 38. Such means is in the form of a semi-circular guide member 44 mounted on the side plate 34 by means of bolts 39. The leading edge 46 of the guide member is located next to the magazine 26 and the trailing edge 48 is located at the discharge point of the hanger rod above the blank as more particularly described hereinafter. When a hanger rod is deposited into the grooves 40 in the transfer wheels 38, the wheels are indexed one step to move the hanger rod under the guide. Simultaneously the hanger rod 18 in the grooves 40 at the trailing edge 48 of the guide member will be indexed to a position over the glue strip on the file folder blank. The hanger rod 18 will be free to drop out of the grooves 40 onto the glue strip or bead 16 on the blank.

Means may be provided on the shaft 36 for supporting the center of the hanger rods as they are carried by the wheels 38 to the blank 10. Such means can be in the form of a pair of back up wheels 50 each having a plurality of grooves 52 corresponding to the grooves 40 in the feed wheels 38 or merely smooth wheels having an outer diameter equal to the inner diameter of the grooves 40 in wheels 38.

The shafts 36 for the transfer wheels 38 are driven in a step by step manner by means of a geneva gear box 31 mounted on the end of drive shaft 33. In this regard, the step by step motion of the geneva gear box 31 is transferred to the shaft 36 by means of the drive shaft 33. Miter gears 5 are provided on the drive shaft 33 which engage corresponding miter gears 7 provided on the ends of shafts 36. The geneva gear box 31 is driven off of a line shaft (not shown) in a one to one ratio to provide one step of motion for each revolution of the line shaft. Each step of motion of the transfer wheels indexing the grooves 40 once to move the hanger rod from the magazine under the guide and the hanger rod at the bottom from this guide.

The hanger rods 18 are fed to the feed wheels 38 by gravity through magazines 26. Each of the magazines as seen in FIGS. 2 and 7 includes a support plate 54 and a guide assembly 56. The guide plate 54 includes a hole 55 at the lower end and a hole 57 at the upper end and is supported on the conveyor by means of the upper shaft 32 which extends through holes 55 and a support assembly 58.

In this regard the support assembly 58 includes a cross rod 60 mounted on the top of the cross plate 28 and an adjustable I-bolt 62 which supports the cross bar 60. The cross bar 60 extends through the holes 57 in the upper end of the guide plates 54 to support the magazines in an angular relation to the transfer wheels 38. The angle of the magazine can be varied by means of the adjustable I-bolt 62.

The guide assembly 56 as seen in FIG. 7 includes a slide plate 66 and a guide rod 68. The plate 66 is mounted on the guide plate 54 and the rod 68 is supported on the guide plate 54 by means of C-shaped members 70 secured to the side of the guide plate 54. The C-members 70 are welded to the side of the plate 54 with the rod 68 welded to the end of the C-member in a position to ride in the groove 19 of the hanger rods 18.

It should be noted that the guide member on the transfer assembly 20 on the feed side of the conveyor has the rod 68 welded to the upper edge of the plate 54 and the plate 66 secured to the end of the C-member 70. The hanger rods 18 on the feed side of the conveyor are positioned in the guide assembly with the groove 19 facing downward while the hanger rods 18 placed in the guide assembly on the opposite side of the conveyor are positioned in the guide member with the grooves 19 facing upward. As seen in FIG. 3, the hanger rods are free to slide by gravity downwardly into engagement with the periphery of the wheel 38. As a groove 40 is moved into alignment with the hanger rod, the hanger rod will drop into the groove 40 and move with the wheel 38 under the guide member 44. With this arrangement the hanger rods will be rotated around to a position immediately over the blanks 10 with the grooves 19 facing each other.

The file folder blanks 10 are advanced into the rod pickup and transfer station 20 by means of a plurality of conventional drive belts 71 located below the blanks 10. Means are provided to momentarily stop the file folder blanks 10 in a predetermined position for receiving the hanger rods 18. Such means, as seen in FIGS. 2, 3, 4 and 5, comprises a pair of stop members 82 mounted on the ends of support bars 84. Each support bar 84 is supported on a support shaft 86 by pivot arms 88. In this regard, pivot pins 90 are used to connect the support bars 84 to the pivot arms 88 to allow for controlled vertical movements of the support bars 84. The vertical movement of the support bars 84 is provided by means of a cam 92 mounted on a cam shaft 94 journaled in the frame 30. The cam 92 being positioned to engage cam followers 96 pivotally mounted on the lower pivot pins 90 in the support bars 84. As described hereinafter, the cams 92 are rotated through one revolution in each cycle of motion to move the stop member 82 into the path of travel of the file folder blank 10 and to drop the stop member 82 below the path of travel at the start of the next cycle.

Figure 5:
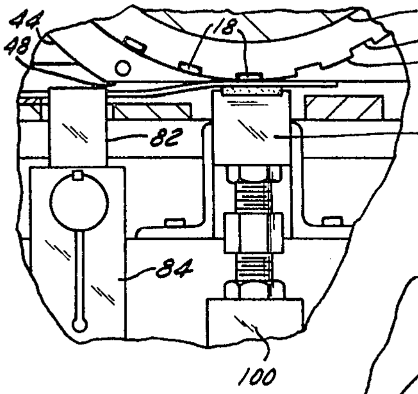
FIG. 5 is a view of the file folder lift plate shown in FIG. 4.
Figure 4:
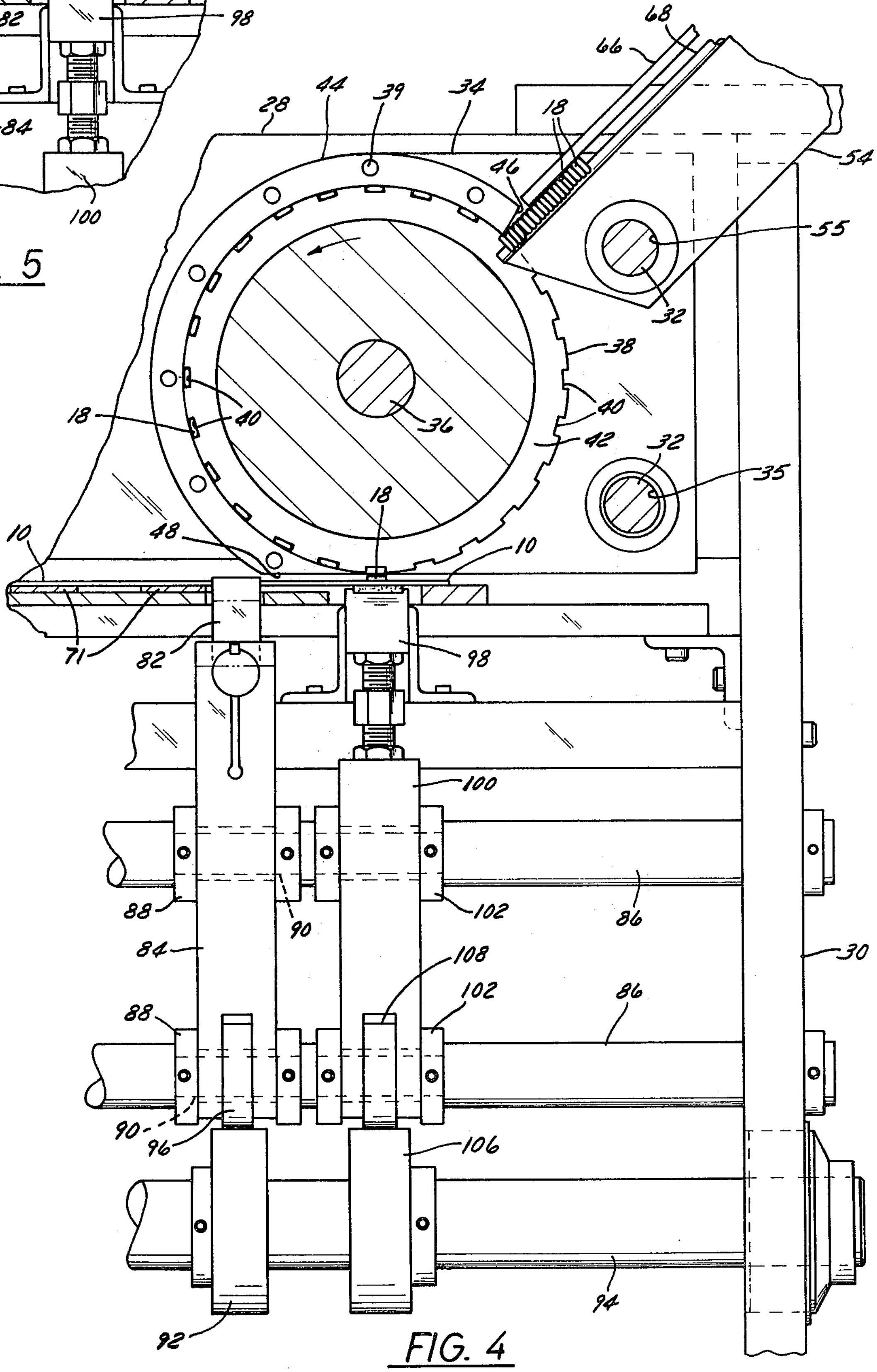
FIG. 4 is an enlarged view of the hanger rod transfer assembly shown on the load side of FIG. 2.

Means are provided for moving the portion of the file folder blank 10 having the glue strip 16 into engagement with the hanger rod 18 while the rod 18 is in the groove 40 in the transfer wheel 38. Such means, as seen in FIGS. 4 and 5, is in the form of a pressure pad 98 located beneath the path of travel of the file folder blank 10. Each pressure pad 98 is supported on a front support element 100 and a rear support element 101 for vertical movement into engagement with the portion of the file folder blank 10 beneath the transfer wheels 38.

In this regard, the support elements 100 and 101 are each pivotally connected to a pair of pivot arms 102 by means of pivot pins 104. The pivot arms 102 being pivotally connected to support rods 86 to produce a substantially vertical movement of the support elements. Vertical movement of the pressure plate 98 is provided by means of a cam 106 mounted on cam shaft 94 in a position to engage a cam follower 108 mounted on pivot pin 104. The cam 106 rotating one revolution for each file folder to move the pressure pad upward in synchronism with the transfer wheel 38.

The file folders 10 are advanced to the folding station after the stop members 82 drop below the path of motion of the blanks by means of a drive assembly 72. The drive assembly 72 includes a pair of drive wheels 74 mounted on a shaft 76. Means are provided to rotate the shaft 76 in synchronism with the stop members 82. Such means is in the form of a belt 78 connected to a shaft 80 to rotate the wheels 74 through one revolution to move each file folder blank 10 to the next station.

The drive system as seen in FIG. 3 is driven off of the line shaft (not shown) to provide one to one revolutions of movement to each of the shafts 80 and 94 in the system. The file folder drive 72 advances the file folder blank 10. The file folders are stopped momentarily by means of the stop members 82 are moved up into the path of motion of the next file folder blank 10. The hanger rod transfer assembly 24 is sequenced once by the geneva drive box 31 in each cycle to move a hanger rod 18 to a position where it will be free to be dropped onto the blank 10. Simultaneously with the release of the hanger rod 18 from the transfer assembly 24, the pressure pad 98 is moved up to push the glue strip or bead 16 against the hanger rod 18, as seen in FIG. 5. This movement is important to assure that the hanger rod 18 is pressed against the glue strip or bead 16 to secure the rod 18 to the file folder blank 10. The pressure pad 98 and stop member 92 are then dropped down to allow the blank 10 to be moved by the drive assembly 72 to the glue and fold station.

I claim:

1. A machine for automatically applying hanger rods to the opposite edges of a file folder blank, said machine including
   - a conveyor for carrying file folder blanks in succession along a longitudinal path,
   - a glue applicator for applying strips of glue at a spaced distance from and parallel to the edges of each blank,
   - the improvement comprising means for depositing hanger rods on the glue strip on each edge of the blank,
   - said means including a hanger rod magazine and
   - a hanger rod transfer assembly for transferring hanger rods from the magazine to a position immediately above the glue strip on the blank,
   - said hanger rod transfer assembly includes two pair of transfer wheels,
   - one pair of transfer wheels being mounted for rotary motion on each edge of the blank in a direction transverse to the direction of travel of the blanks and having a plurality of grooves for carrying the hanger rods from the magazine to a release point above the blank, said hanger rod being released from said grooves as the groove is moved to a position above the glue strip.

2. The machine according to claim 1 including means for moving the portion of the edge of the blank containing the glue strip upward to a position to receive the hanger rod as the rod is released from said transfer assembly.

3. The machine according to claims 1 or 2 including means for momentarily stopping the blanks in a predetermined position under the hanger rod transfer assembly.

4. The machine according to claim 1 wherein said assembly includes a guide plate adjacent to the outer peripheral surface of each wheel for holding the hanger rods in the grooves.

5. A hanger rod transfer assembly for transferring hanger rods from a hanger rod magazine to a position in alignment with glue strips on a file folder blank, said assembly comprising a pair of wheels mounted for rotary motion in a direction transverse to the direction of travel of the blanks, each wheel having a plurality of equally spaced grooves, a semi-annular guide plate positioned adjacent to each of said wheels whereby hanger rods deposited in the grooves at the top of the wheel will be retained in the grooves until the wheel is rotated far enough for the groove to clear the other end of the guide plate allowing the hanger rod to be released from the wheel for deposit on the glue strip on the file folder blank.

6. The hanger rod assembly according to claim 5 including magazine means for feeding hanger rods to the grooves of the wheels.

7. The assembly according to claim 6 wherein said magazine means includes a pair of slides angularly disposed with respect to the wheels and guide means on each slide for holding the hanger rods on the slides.

8. An apparatus for placing hanger rods on the edges of file folder blanks in timed sequence to the movement of the blanks through an automatic hanging file folder machine, said apparatus including a pair of hanger rod magazines disposed above the machine, a hanger rod transfer means below each magazine for moving a hanger rod from the magazine to a position over the file folder blank, each said transfer means inludes a pair of transfer wheels mounted for rotary motion in a direction transverse to the direction of motion of the blanks, and guide means adjacent each transfer wheel for holding a hanger rod on the transfer wheel until it is in a position to come in contact with the file folder blank, and means for moving the edges of the file folder blank into a position to receive the hanger rods as the rod is discharged from the transfer means.

9. The apparatus according to claim 8 wherein each of said magazines includes a guide assembly for guiding the hanger rods into the transfer means.

10. The apparatus according to claim 8 including means for advancing the transfer wheels in a step by step manner.

11. The apparatus according to claim 10 wherein each of said transfer wheels includes a plurality of grooves, said hanger rods being fed by gravity from said magazines into peripherally aligned grooves in the transfer wheels.

12. The apparatus according to claim 11 wherein each of said magazines includes a guide assembly for holding the hanger rods in an aligned relation with respect to the grooves in the transfer wheels.

* * * * *